(No Model.)

B. C. ESMARCH.
LATHE CARRIER.

No. 530,303. Patented Dec. 4, 1894.

Witnesses
E. H. Sturtevant
A. D. Büsing

Inventor
Bernard Charles Esmarch
by Richards & Co. Attys

UNITED STATES PATENT OFFICE.

BERNARD CHARLES ESMARCH, OF SELLY OAK, ENGLAND.

LATHE-CARRIER.

SPECIFICATION forming part of Letters Patent No. 530,303, dated December 4, 1894.

Application filed May 8, 1894. Serial No. 510,478. (No model.) Patented in England May 9, 1892, No. 8,744, and in Germany February 11, 1893, No. 70,501.

*To all whom it may concern:*

Be it known that I, BERNARD CHARLES ESMARCH, a subject of the Queen of Great Britain, residing at Selly Oak, in the county of Worcester, England, have invented certain new and useful Improvements in Lathe-Carriers, of which the following is a specification.

Patents for this invention have been granted in Great Britain, No. 8,744, dated May 9, 1892, and in Germany, No. 70,501, dated February 11, 1893.

My invention relates to lathe carriers or drivers employed for the purpose of revolving shafts, mandrels, or other articles carried between the centers of a turning lathe.

The object of my invention is to construct a lathe carrier or driver of moderate dimensions, that may be employed with articles or work of very varying dimensions, and be more readily and securely attached to such articles, whether having parallel or tapered external surfaces, than the carriers of ordinary construction at present in general use.

The accompanying sheet of explanatory drawings illustrates the general forms and configurations of my improved lathe carriers.

Figure 1:
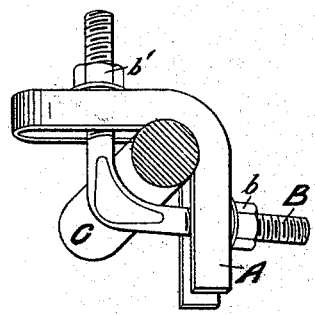

Figure 1 is an illustration of one general type of construction. A is a short rod or strip of steel or other suitable material of a rectangular section, suitably bent or shaped as illustrated to form the carrier frame and to allow of the insertion of the clamping bolt or stud B. This bolt B is bent so that its tails or arms are at right angles to the tails or arms of the carrier frame, such tails or arms being screwed to receive the nuts $b\ b'$. The circular bar C or other article or work to be turned or machined in the lathe, is securely held at the angle of the carrier frame by the clamping or gripping action produced on tightening the nuts $b\ b'$.

Figure 2:
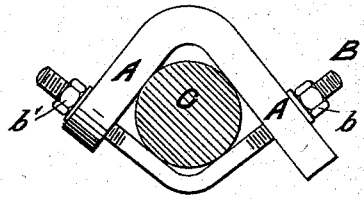
Figure 3:
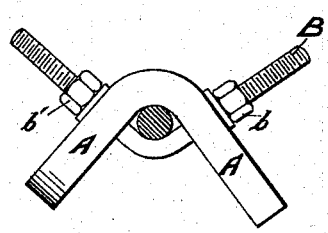

Fig. 2 is an illustration of my improved carrier when clamped to a bar of considerable diameter, while Fig. 3 represents the same carrier clamped to a small bar.

Figure 4:
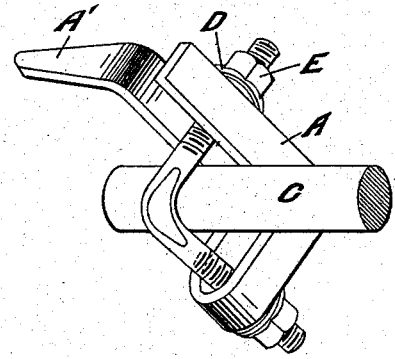

The carrier, together with the work to which it is attached, may be caused to revolve by contact with the driver pin of the lathe, or by means of the tail piece A' formed with the frame A of the carrier, as illustrated at Fig. 4. This tail enters within a slot in the face plate of the lathe, and may be either twisted or tapered to enable it to more readily enter slots of varying angles and dimensions formed on the face plate.

Figure 5:
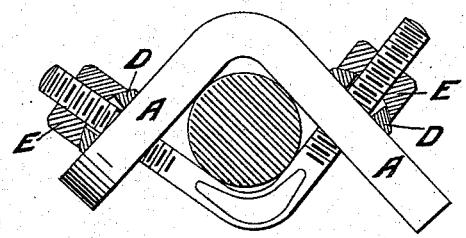
Figure 6:
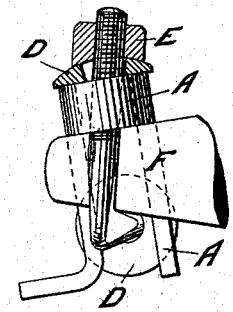

To enable the carrier to be readily clamped to the work, without the necessity of setting the respective sides or arms of the frame carefully at right angles with the ends or tails of the angular clamping bolt, I employ washers and nuts such as D and E illustrated in section at Fig. 5, and also at the upper part of Fig. 6. These washers have a convex upper face to form a bed or seating for the concave lower face or surface of the nut. The hole in the washer is tapered, having its larger end at its upper and convex face. This allows the screwed ends or tails of the clamping bolt to have some play or movement in the washers, and as the spherical surfaces of contact allow the nuts to move in any direction upon the washers, the under or lower face of the washers will always lie flat upon the carrier frame A, even if the screwed ends of the clamping bolt be not at right angles to the arms of the frame. In this manner I insure greater convenience in handling, with less liability to break the screwed arms of the clamping bolts by the stress from tightening the nuts.

By the employment of convex faced washers and concave faced nuts, as hereinbefore described, I am enabled to readily attach my improved carrier to a bar or other article or work, having tapered surface, such as the bar F, Fig. 6. The space formed in or between the carrier frame A must have sufficient width to enable the clamping bolt to adjust itself to the required position, such as shown at Fig. 6.

It will be noticed that the part A is formed by taking a strap of metal and bending the same back upon itself in angular form leaving a slot or opening between the parallel limbs of the strap, the end of one side or limb being bent laterally to attach the carrier to the lathe head.

Having now particularly described and ascertained the nature of my said invention and in what manner the same is to be performed, I declare that what I claim is—

1. A lathe carrier comprising the metallic strap A bent back upon itself and also into angular form with its sides parallel and the angular bolt passing between the angular sides of the part A with nuts for securing the same in place.

2. A lathe carrier comprising the metallic strap bent back upon itself and also into angular form with its sides parallel and a lateral extension from one side of the strap, the angular bolt and the nuts for holding the same in position, substantially as described.

3. In a lathe carrier the combination of an angular frame, with an angular clamping bolt or stud, provided with nuts at each end having a concave lower surface, seating upon the convex upper surface of a washer lying or resting flat or evenly upon the carrier frame, for the purpose of securely clamping the carrier to tapering or other articles of work, substantially as described.

In witness whereof I have hereunto set my hand in presence of two witnesses.

BERNARD CHARLES ESMARCH.

Witnesses:
CHRISTIAN OTTO BOALTH,
EDWARD CHARLES ROBERT WINTER.